(12) United States Patent
Paul et al.

(10) Patent No.: US 7,668,273 B2
(45) Date of Patent: Feb. 23, 2010

(54) METHOD AND APPARATUS FOR SYNCHRONIZATION OF A MOBILE RADIO RECEIVER TO A BASE STATION

(75) Inventors: Steffen Paul, Baierbrunn (DE); Thomas Ruprich, München (DE); Louay Jalloul, Naperville, IL (US)

(73) Assignee: Infineon Technologies AG, Munich (DE)

(*) Notice: Subject to any disclaimer, the term of this patent is extended or adjusted under 35 U.S.C. 154(b) by 829 days.

(21) Appl. No.: 10/979,639

(22) Filed: Nov. 2, 2004

(65) Prior Publication Data

US 2005/0117679 A1 Jun. 2, 2005

(30) Foreign Application Priority Data

Nov. 5, 2003 (DE) ................. 103 51 649

(51) Int. Cl.
*H04L 7/00* (2006.01)
(52) U.S. Cl. ........................ 375/354; 375/355
(58) Field of Classification Search ................. 375/343, 375/354, 355
See application file for complete search history.

(56) References Cited

U.S. PATENT DOCUMENTS

| 4,291,409 | A | 9/1981 | Weinberg et al. |
| 4,621,365 | A | 11/1986 | Chiu |
| 6,728,326 | B1* | 4/2004 | Fulghum ................ 375/365 |
| 6,882,633 | B2* | 4/2005 | Dotsch et al. ............ 370/335 |
| 2002/0196772 | A1* | 12/2002 | Becker et al. ............ 370/350 |
| 2003/0021366 | A1* | 1/2003 | Becker et al. ............ 375/343 |
| 2004/0247017 | A1* | 12/2004 | Hofmann et al. .......... 375/141 |

FOREIGN PATENT DOCUMENTS

| EP | 0 994 613 A1 | 4/2000 |
| EP | 1 191 703 A1 | 3/2002 |
| EP | 1191703 A1 * | 3/2002 |
| EP | 1 313 281 A1 | 5/2003 |
| WO | WO 00/30312 A1 | 5/2000 |

* cited by examiner

*Primary Examiner*—Curtis B Odom
(74) *Attorney, Agent, or Firm*—Eschweiler & Associates, LLC

(57) ABSTRACT

In a method for synchronization of a mobile radio receiver to a base station, the received signal is sampled using oversampling, by which means sample values are obtained from different sampling phases. The oversampled signal is correlated with a local code, with sample values that are associated with a first sampling phase being processed with a frequency offset with respect to sample values that are associated with a second sampling phase.

23 Claims, 9 Drawing Sheets

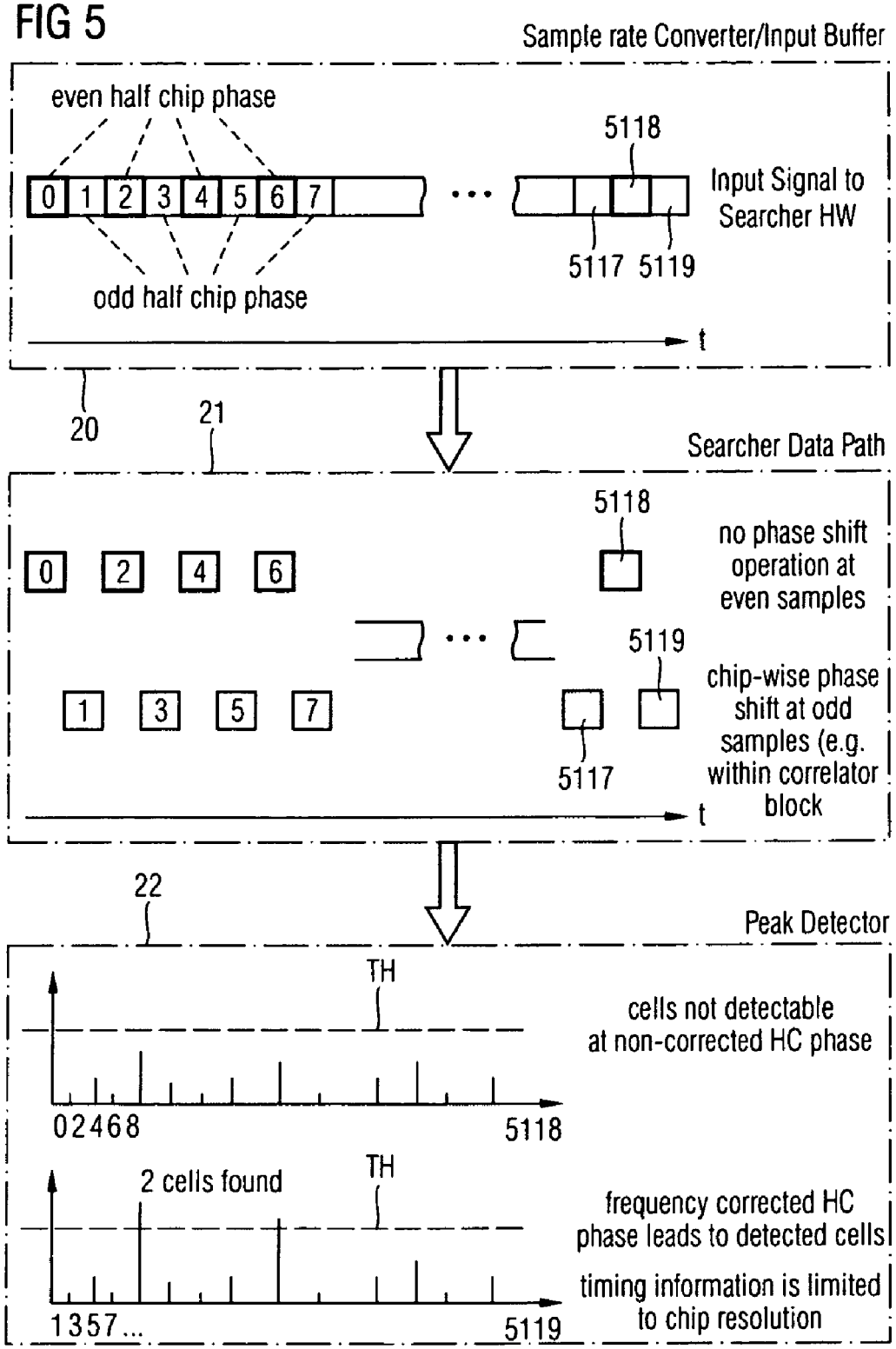

Single frequency processing

Double frequency processing

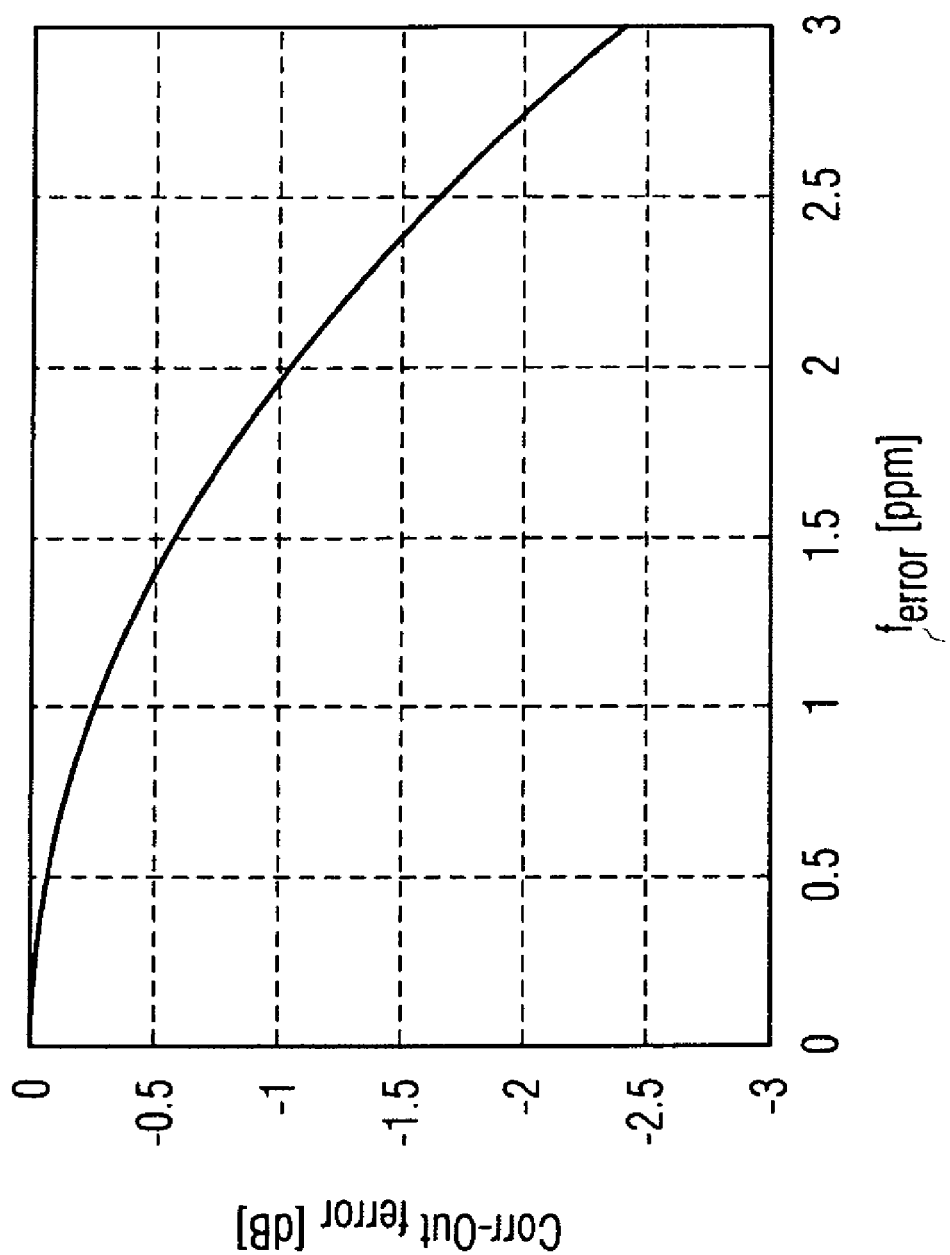

METHOD AND APPARATUS FOR SYNCHRONIZATION OF A MOBILE RADIO RECEIVER TO A BASE STATION

REFERENCE TO RELATED APPLICATIONS

This application claims the benefit of the priority date of German application DE 103 51 649.2, filed on Nov. 5, 2003, the contents of which are herein incorporated by reference in their entirety.

FIELD OF THE INVENTION

The invention relates to a method and an apparatus for synchronization of a mobile radio receiver to a base station when there is a frequency offset between the transmitter (base station) and the mobile radio receiver.

BACKGROUND OF THE INVENTION

Before setting up a data connection to one or more base stations, the transmission clock and reception clock in each mobile radio receiver must be synchronized. This is generally achieved by means of a three-step method: slot synchronization (time slot synchronization) is carried out in a first synchronization step. Once the slot timings are known, the frame boundaries of the signal are determined in a second synchronization step (a frame synchronization). The scrambling code that is used by the transmitter (base station) is identified in a third synchronization step.

One of the major performance criteria for a synchronization apparatus is the detection probability (the probability of detecting a payload signal in the received signal), the false alarm rate (the probability of identifying a disturbance as a payload signal), the mean acquisition time and the time that the system requires in order to confirm negative detection (lack of synchronization). The detection probability should be as high as possible, the false alarm rate should be as low as possible, the mean acquisition time should be as short as possible, and the time to confirm negative detection should likewise be as short as possible.

The performance of a synchronization apparatus is significantly dependent on the frequency error that may exist between the transmitter and the receiver. In order to ensure optimum synchronization performance, the transmitter and the receiver must as far as possible operate with the frequencies accurately synchronized. If the mobile radio receiver has already been synchronized to a base station, then the frequency error with respect to a new cell to be looked for (for example, for a soft handover) is generally negligibly small (for example <0.1 ppm for UMTS). For initial synchronization attempts that, for example, have to be carried out after the mobile radio receiver has been switched on, on the other hand, there may well be a considerable frequency error between the transmitter (base station) and the mobile radio receiver. Typical frequency errors are in the region of 3 ppm. This leads to a considerable deterioration in the performance of the synchronization apparatus. The synchronization times are considerably longer, and in the worst case, the synchronization apparatus may fail completely.

A frequency error between the oscillator frequency of the transmitter (base station) and the oscillator frequency of the mobile radio receiver decreases the detection probability for a cell to be detected by the mobile radio receiver and, in consequence, the probability of the mobile radio receiver being able to successfully synchronize itself to this cell. In order to achieve a specific detection probability for a predetermined minimum received power level, two or more synchronization attempts, for example in series successively, are generally carried out until negative detection is signalled. It is normally necessary to search through a large number of frequency bands until cell synchronization is possible or negative detection can be confirmed. Thus, in practice, a compromise must be found between the achievable detection probability and the time period for negative detection. According to the prior art, there are two possible ways to increase the detection probability:

1. The number of synchronization attempts is increased. This increases the detection probability. However, this likewise increases the time period to confirm negative detection. Since it is frequently necessary to search through a large number of frequency bands before cell synchronization is possible, the increase in the number of synchronization attempts leads directly to the acquisition time being lengthened. In consequence, the improved detection probability is at the expense of, in some cases considerably longer acquisition times. The overall performance of the system is not improved in this case.
2. The frequency error between the transmitter and the mobile radio receiver is reduced, for example, by sampling a specific frequency band with a frequency grid that is as small as possible. For example, the step width of 6 ppm (maximum frequency error of 3 ppm) is reduced to a step width of 3 ppm (maximum frequency error of 1.5 ppm) with respect to the carrier frequency $f_c$. Halving the maximum frequency error on the one hand considerably improves the detection probability, but on the other hand, also doubles the sampling time period for a predetermined frequency band, and thus the acquisition time. For example, a frequency band of 60 MHz around a carrier frequency of $f_c=2$ GHz is available for UMTS (Universal Mobile Telecommunications System). About 5000 frequencies would have to be searched through for a step width of 6 ppm. Even if the mean search time were only 50 ms per frequency, doubling the number of frequencies to be searched through would incur an additional time penalty of about 250 s, and would thus considerably increase the mean acquisition time. Furthermore, the overall performance of the system is not significantly improved in this way.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The invention is directed to a method as well as an apparatus for synchronization of a mobile radio receiver to a base station which ensures significantly better synchronization performance, particularly for an initial synchronization procedure (initial cell search), without increasing the processing time period in comparison to the prior art.

According to the invention, in the case of the method, the received signal is sampled using oversampling, thus resulting in sample values for different sampling phases. The expression oversampling in this case relates to the smallest information-carrying unit in the received signal, that is to say to a chip in a CDMA system (Code Division Multiple Access). The oversampled signal is correlated with a local code (whose presence in the received signal is intended to be verified), with sample values that are associated with a first sampling phase being processed with a frequency offset with respect to sample values that are associated with a second sampling phase.

In other words, the sampling phases that are generated in the receiver are processed at different frequencies. Synchronization attempts can be carried out at the same time at these different frequencies. In the case of a signal which has been oversampled N times up to N frequencies may be searched through at the same time. This therefore results (with the exception of the complexity for frequency shifting) in no increase in the processing effort, since the increase in the processing bandwidth is at the expense of the time resolution capability. Furthermore, in comparison to the prior art, this does not result in any lengthening of the processing time period (that is to say, no lengthening of the acquisition time or of the time for negative detection) since the same frequency search grid is used as in the prior art, so that the number of synchronization attempts is not increased.

The invention is based on the discovery that degradation effects which are produced by the effective sampling rate in the individual frequency channels (also referred to in the following text as processing frequencies) being less than the actual sampling rate—that is, the time resolution of the optimum sampling time which can be achieved by N-times oversampling cannot be utilized with the method according to the invention—is more than compensated for by the increase in the simultaneously processed frequency channels and the reduction in the frequency error associated with this.

The M frequencies ($M \leq N$) are preferably distributed equidistantly within a predetermined frequency interval. This results in a uniform distribution of the frequencies over the step width of the frequency search grid that results from the frequency interval.

The frequency interval over which the M frequencies are distributed is preferably approximately 12 kHz. This frequency corresponds approximately to the cut-off frequency of a correlator in UMTS systems with a symbol duration of 256 chips (both the first synchronization code in the P-SCH (Primary Synchronization) channel of UMTS and the second synchronization code in the S-SCH (Secondary Synchronization) channel each have 256 chips). The cut-off frequency of about 12 kHz corresponds to a search grid step width of 6 ppm. The maximum frequency error that would occur with a correlator according to the prior art is 3 ppm. The method according to the invention reduces this to (3/M) ppm.

The apparatus according to the invention has a means for correlation of the oversampled signal with a local code, with sample values that are associated with a first sampling phase being processed with a frequency offset with respect to sample values that are associated with a second sampling phase. As already mentioned, the increase in the processing bandwidth of the apparatus results in a significant improvement in the synchronization performance, at the expense of the time resolution capability.

BRIEF DESCRIPTION OF THE DRAWINGS

The invention will be explained in more detail in the following text using exemplary embodiments and with reference to the drawings, in which:

FIG. 5 shows a schematic illustration in order to explain the principle of operation of the synchronization apparatus according to the invention;

FIG. 8 shows a graph illustrating the signal attenuation as a function of the frequency error between the transmitter and receiver;

DETAILED DESCRIPTION OF THE INVENTION

First of all, in order to assist understanding of the following text, an example of a mobile radio standard (UMTS) will be used to explain the steps that have to be carried out by a mobile station during an initial cell synchronization process. In this case, the channel structure is based, by way of example, on the UMTS Standard.

Figure 1:
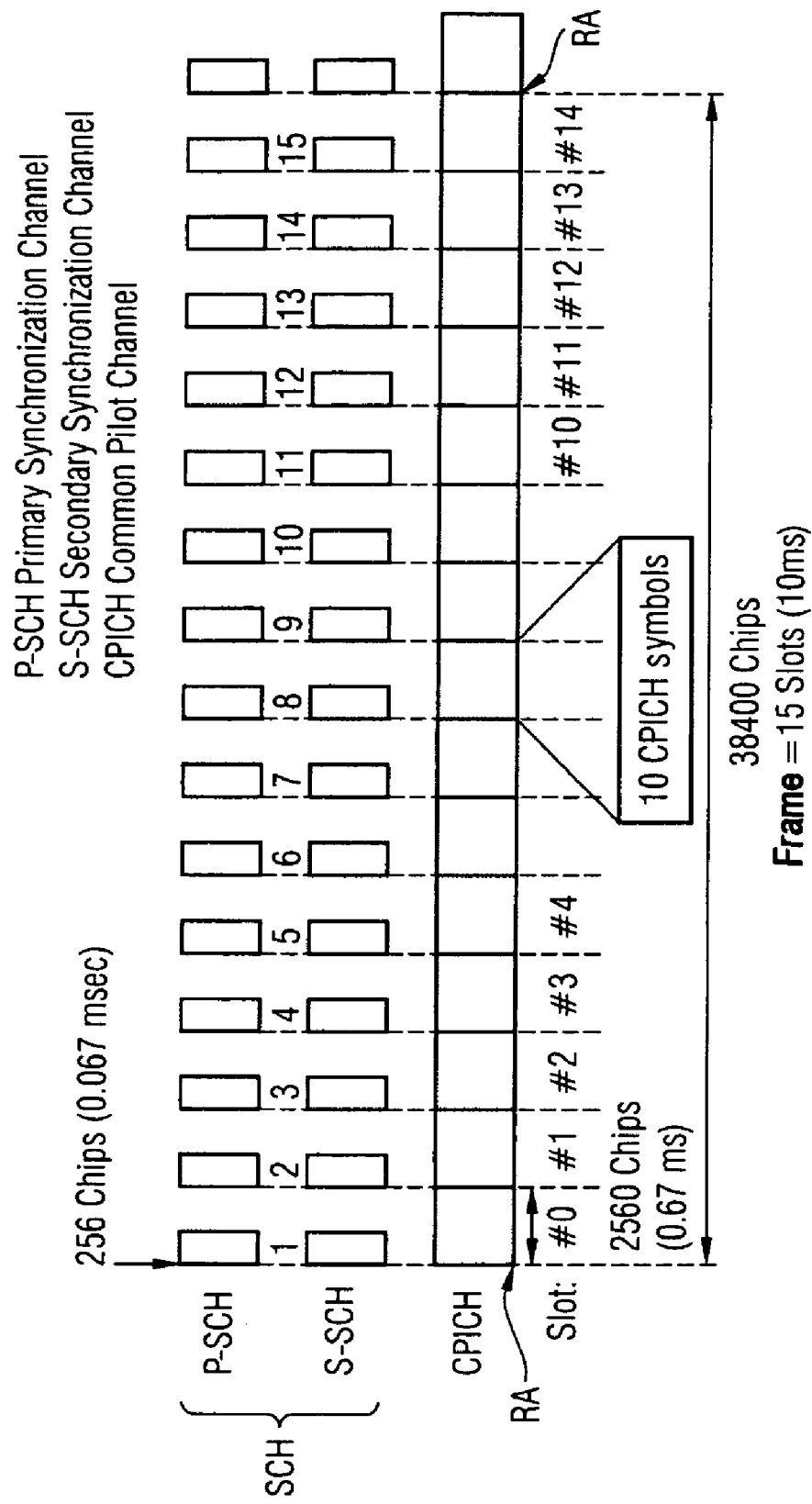
FIG. 1 shows a schematic illustration of the channel structure of the synchronization channel SCH and of the common pilot channel CPICH in the UMTS Standard.

As is shown in FIG. 1 a UMTS frame comprises 15 slots (#0, #1, . . . , #14). Each slot may contain 2560 chips. The chip time duration $T_{chip}$ in the UMTS Standard is 0.26 μs. In consequence, the slot time duration is 0.67 ms, and the frame duration is 10 ms.

Two UMTS channels are involved in the synchronization of the mobile station to a base station (cell search), specifically the synchronization channel SCH and the common pilot channel CPICH. The synchronization channel SCH comprises a first synchronization channel P-SCH (Primary Synchronization Channel) and a second synchronization channel S-SCH (Secondary Synchronization Channel). At the start of each slot, the base station in each case transmits the same sequence of 256 chips in the P-SCH. The receiver is synchronized to the slot clock by detection of this sequence (which is also referred to as the symbol of the P-SCH), which is known in the receiver.

At the start of each slot, the base station likewise transmits a sequence of 256 chips in the S-SCH. The sequences (symbols) transmitted in the individual slots differ, however. The receiver uses the already existing slot synchronization process to detect the different sequences in the S-SCH. The receiver uses the detected sequences in the S-SCH to determine those slots which form frame starts RA. Furthermore, the base station signals to the receiver, by the choice and sequence of the transmitted sequences in the S-SCH, the code group from which the scrambling code being used in the base station originates. The number of possible scrambling codes is thus restricted, thus simplifying the scrambling code identification process that is carried out in the next step.

After the slot and frame synchronization with the aid of the SCH, the receiver identifies the scrambling code on the basis of the CPICH. 10 CPICH symbols are transmitted in each slot. Each CPICH symbol is a sequence that is known in the receiver and comprises 256 chips. Since the CPICH has been scrambled using a scrambling code, it can be used for identification of the scrambling code being used by the base station (within the already known code group).

Figure 2:
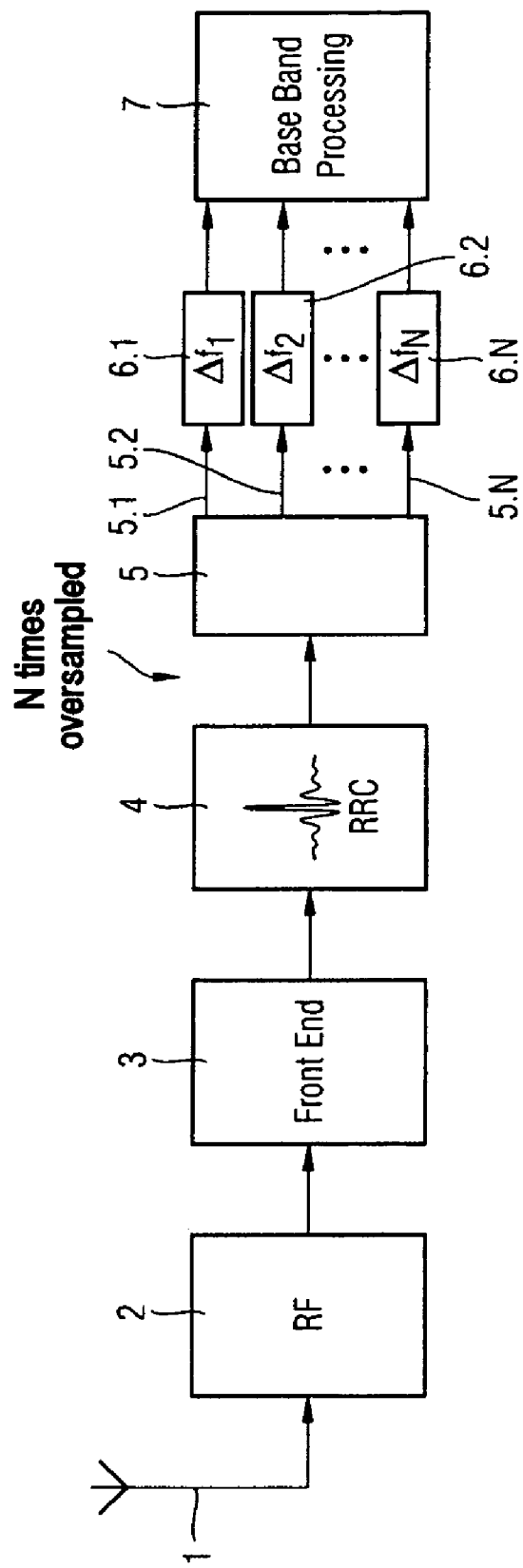
FIG. 2 shows a block diagram of a synchronization apparatus according to the invention.

According to FIG. 2, a radio signal received via an antenna 1 is down-mixed in a radio-frequency section 2 to baseband or to an intermediate frequency range, and is processed further in an input-side processing unit (front end) 3 of the receiver in some suitable manner. The received signal is subjected to signal forming in an RRC filter 4 (Root Raised Cosine). A unit 5 downstream from the RRC filter 4 uses oversampling to sample the formed signal, that is to say it samples it at a sampling rate of $N \cdot f_{chip}$, with $f_{chip}$ denoting the chip frequency. The oversampling results in N sample values with different sampling phases with respect to the chip being produced for each chip time period. The sample values associated with each sampling phase are emitted via N outputs 5.1, 5.2, ..., 5.N and are passed to respective frequency shifting stages 6.1, 6.2, ..., 6.N. The frequency shifting stages 6.1, 6.2, ..., 6.N produce, for example, a frequency shift through $\Delta f_i = (i-1) \Delta f_{step}/N$ where $i=1, \ldots, N$. The step width of the frequency search grid is in this case denoted by $\Delta f_{step}$ (for example 12 kHz).

In general, the frequency offset $\Delta f_i$ need not be equidistant, and the number of frequency shifting stages 6.1, ..., 6.N may be less than N. In the case of N-times oversampling, this means that, in general, there may be a total of M frequency offset stages, where $M \leq N$.

The sample values of the N sampling phases (of which M-1 have a frequency offset applied to them) are processed in a baseband processing unit 7. The processing generally includes a correlative evaluation of the individual signals with the different processing frequencies, with respect to the code to be verified (for example, the sequence of the P-SCH or of the S-SCH).

Figure 3:
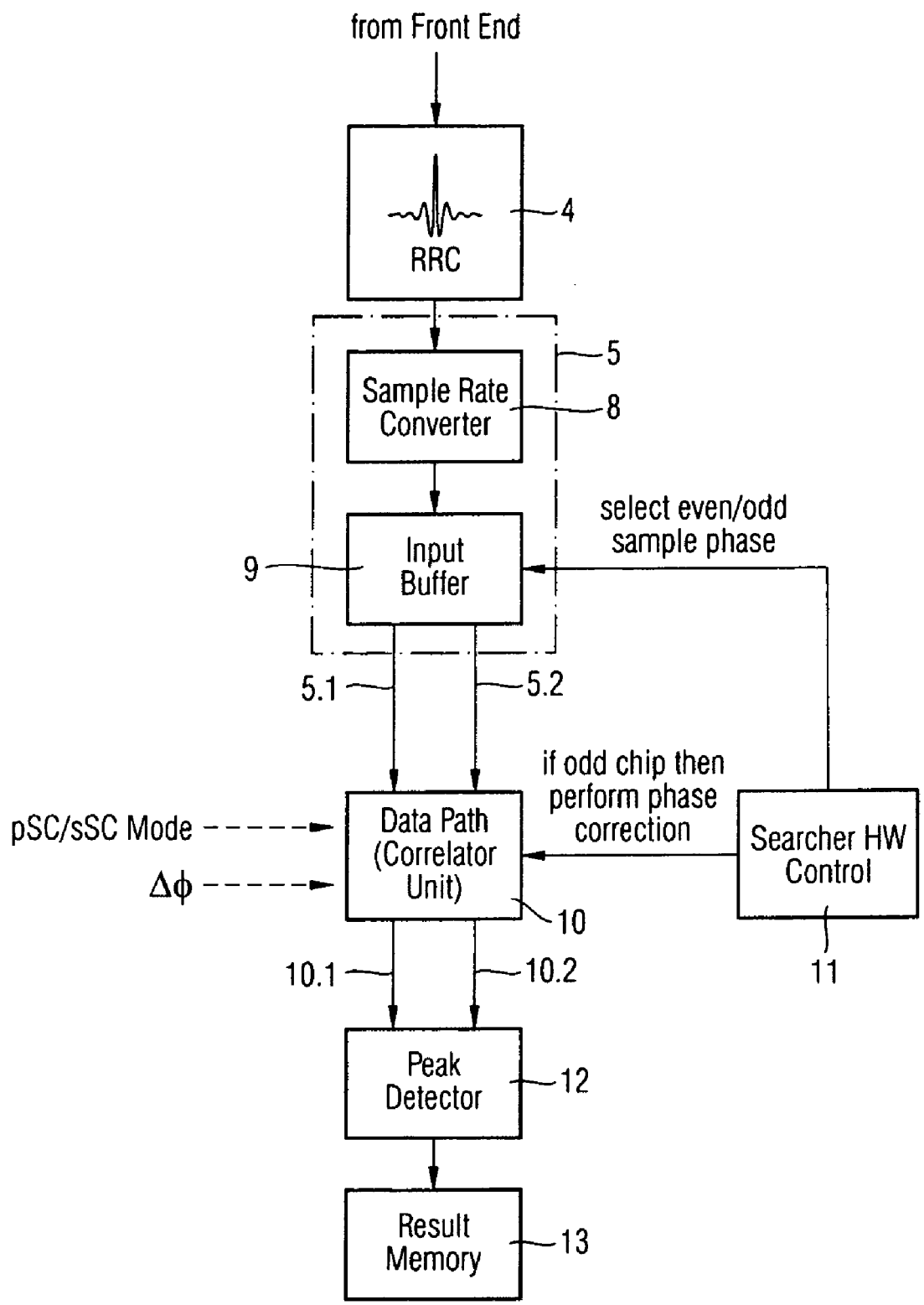
FIG. 3 shows a block diagram in order to explain the design of a synchronization apparatus according to the invention, with two processing frequencies.

FIG. 3 shows the design of a synchronization apparatus according to the invention, using the example of a doubly oversampled baseband signal (N=M=2). Mutually corresponding components are denoted by the same reference symbols as in FIG. 2. The oversampling is carried out by means of a sampling unit 8 in which sampling rate conversion may also be carried out. The oversampled signal is passed to an input buffer store 9. Two sample values exist for each chip (and are also referred to as half chips). With the sample values being numbered successively in time, the even-numbered sample values are associated with a first, "even" sampling phase, while the odd-numbered sample values are associated with a second, "odd" sampling phase. Sample values from the even sampling phase are emitted via the output 5.1, while the sample values from the odd sampling phase are passed from the input buffer store 9 via the output 5.2.

The central unit in the synchronization apparatus or searcher (search device) illustrated in FIG. 3 is a correlator data path 10, in which the correlations which are based on sampling phases are carried out, and the frequency of one of the two output signals (in this case: the signal which is emitted at the output 5.2 of the input buffer store 9) is shifted. The input buffer store 9 and the correlator data path 10 are controlled via a control unit 11, which may be in the form of hardware. The control unit 11 controls the input buffer store 9 such that the arriving sample values (half chips) are read alternately via the outputs 5.1 and 5.2. The correlator data path 10 is driven in such a way that only the sample values from one sampling phase (in this case: the "odd" sampling phase) have a frequency off-set applied to them.

The correlation results are emitted at the outputs 10.1 and 10.2 of the correlator data path 10. The correlation results represent the signal energy per symbol. A peak value detector 12 that is connected downstream from the correlator data path 10 determines for each symbol (or else for two or more symbols) in each sampling phase whether the correlation result (or the mean value of the correlation results over a number of symbols) exceeds a specific threshold value. If this is the case, the signal that is being sought by means of the correlative evaluation process is regarded as having been detected. The results from the peak value detector 12 are stored in a result memory 13.

Depending on the synchronization task to be carried out at any given time, the correlator data path 10 is supplied with the code pSC transmitted via the P-SCH or with the current code sSC transmitted via the S-SCH. Furthermore, the correlator data path 10 is informed of the frequency offset which should be allocated to the odd sample values. This is done by presetting a phase change $\Delta\phi$ through which each odd-numbered half chip in the correlator data path 10 is rotated further on the complex plane.

Figure 4:
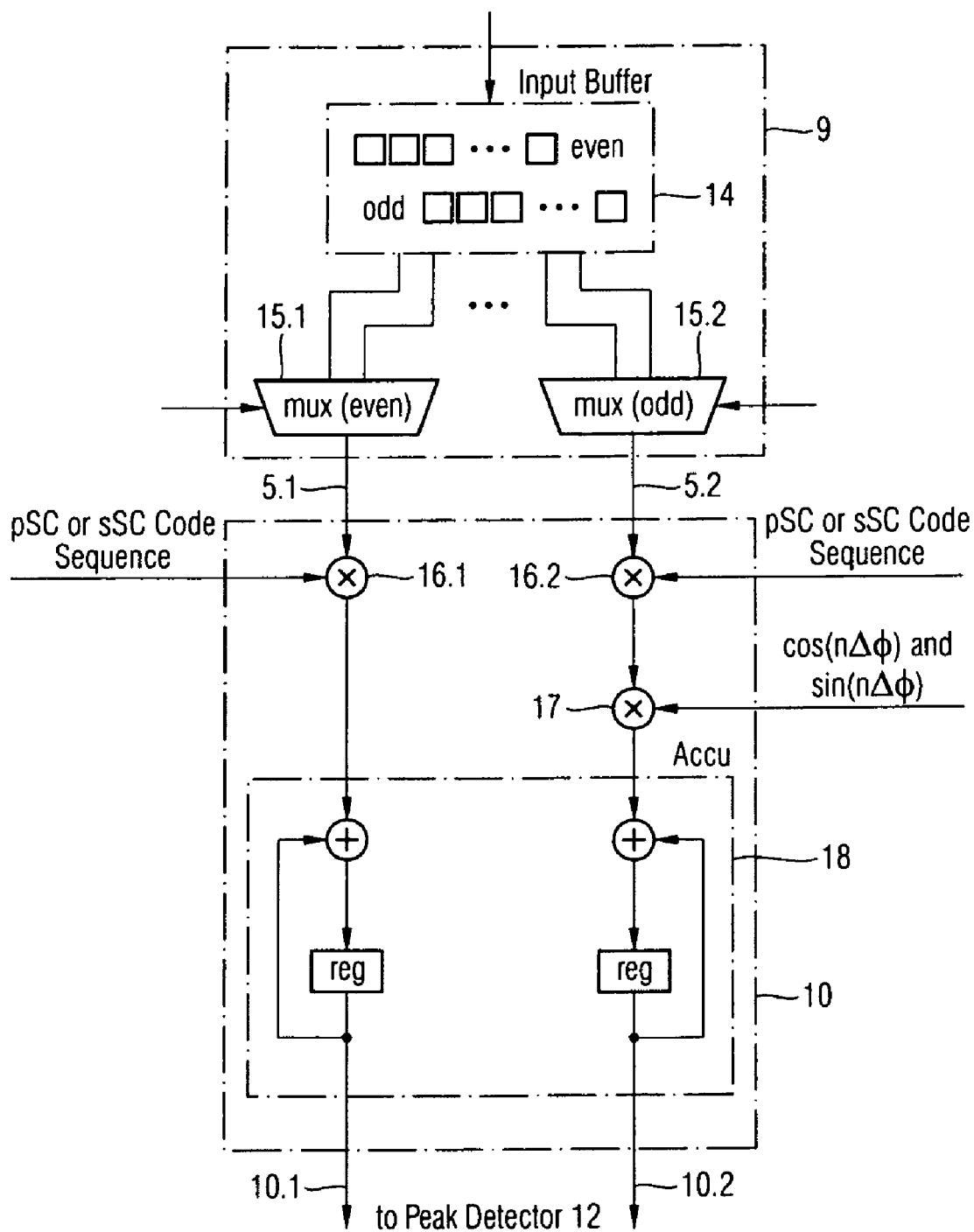
FIG. 4 shows a block diagram of the correlator data path shown in FIG. 3, in which the correlations as well as the settings of the various processing frequencies are carried out.

FIG. 4 shows an example of the circuit design for the input buffer store 9, and the design of the correlator data path 10. The input buffer store 9 has a memory area 14 as well as two multiplexers 15.1 (for the even-numbered half chips) and 15.2 (for the odd-numbered half chips), which are selected alternately.

The even-numbered half chips are correlated with the respective local code (pSC or sSC) by means of a multiplier 16.1, while a multiplier 16.2 is provided for the correlation of the odd-numbered half chips with the local code (pSC or sSC).

The frequency of the odd-numbered half chips is shifted in a manner known per se by chip-by-chip multiplication of a frequency shift sequence by an incrementally increasing phase $n\Delta\phi$, $n=0, \ldots, 255$, by means of the multiplier 17. Alternatively, the frequency can also be shifted without multipliers by means of the known CORDIC algorithm.

Downstream from the multipliers 16.1, 16.2, 17 in the signal path, the odd-numbered and even-numbered half chips (sample values) are each accumulated, separately from one another, over 256 chips in a two-channel accumulator 18.

It should be mentioned that the correlator data path 10 according to the invention and illustrated in FIG. 4 differs from a conventional correlator data path by the presence of the multiplier 17 that produces the frequency offset. This means that, in general, the increased hardware complexity relates only to the production of the frequency offset or offsets. Since, in the case of conventional correlative evaluation of a doubly oversampled signal, the individual sampling phases are likewise evaluated separately (thus achieving the increased time resolution in a method according to the prior art of $T_{chip}/2$ in comparison with $T_{chip}$ with the method according to the invention), the input buffer store 9 that is illustrated in FIG. 4 is also the same as an input buffer store as used in a conventional search device ("searcher").

FIG. 5 illustrates the method of operation of the search device according to the invention: the input data stream for the input buffer store 9, comprising even-numbered and odd-numbered half chips 0, 1, 2, . . . , 5118, 5119, is illustrated in the box 20.

The box 21 illustrates the frequency shift according to the invention in the correlator data path 10. The sequential input data stream is split in the box 21 into even-numbered half chips 0, 2, 4, . . . , 5118 and odd-numbered half chips 1, 3, 5, . . . , 5119 as time passes. The even-numbered half chips are not phase-shifted, while the odd-numbered half chips are phase-shifted chip-by-chip (index n) through $n \cdot \Delta\phi$, $n=0, \ldots, 255$.

The box 22 illustrates the method of operation of the peak value detector 12. The correlation results over the various timings between the local code and the incoming data signal for the even-numbered half chips are shown in the upper part. This clearly shows that the threshold value TH is never reached. No cell is therefore detected in the signal path whose frequency has not been shifted.

The correlation results over the various times between the local code and the arriving data signal for the odd-numbered half chips are illustrated in the lower part of the box 22. Two cells are found in this example. The time resolution is restricted to $T_{chip}$ in both data paths.

Figure 6A:
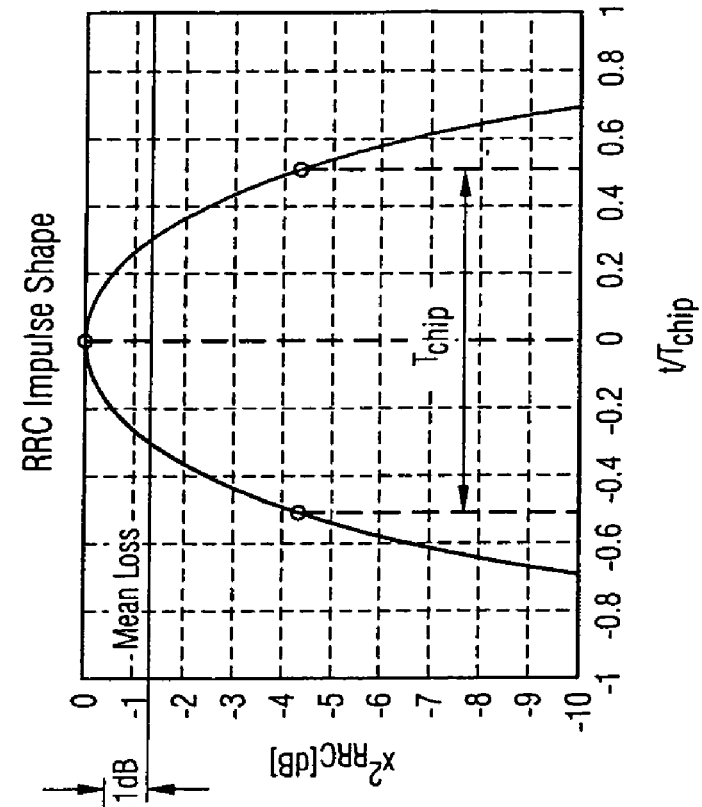
FIG. 6A shows a graph that illustrates the signal attenuation as a function of the sampling time error for a double oversampled signal.

The following text explains in more detail why the method according to the invention leads to a significant advantage in the initial cell search. In this case two effects are considered which lead to losses in the correlative evaluation of the received signal:

1. The presence of a sampling time error:

FIG. 6A shows the loss in dB at the output of the correlator resulting from a sampling time error in the case of a conventional method (single frequency processing). This is based on double oversampling. The maximum loss is −1 dB with a maximum sampling time error of 0.25 $T_{chip}$. The maximum sampling time error is 0.25 $T_{chip}$, since the double oversampling increases the time resolution of the correlative evaluation by a factor of 2.

Figure 6B:
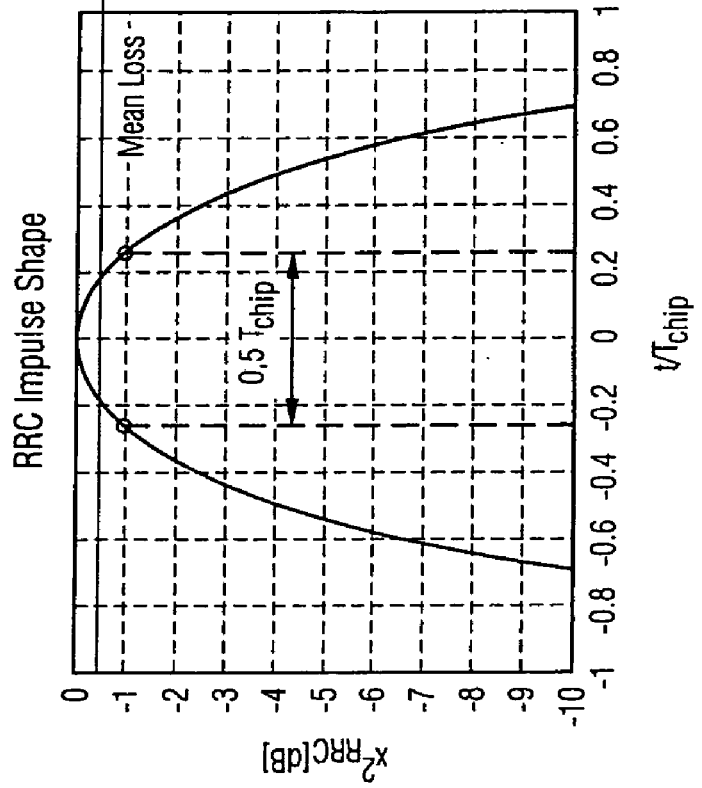
FIG. 6B shows a graph illustrating the signal attenuation as a function of the sampling time error for a single sampled signal.

FIG. 6B shows that a loss of approximately −4.5 dB occurs with a signal sampled at the chip rate and with a maximum sampling time error of 0.5 $T_{chip}$. A maximum sampling time error of 0.5 $T_{chip}$ occurs with the double frequency processing according to the invention, since the time reference between the sampling phases is lost as a result of the frequency shift. Thus, effectively, only single sampling is carried out. The important factor for the invention is that this significantly higher loss than in the case of double oversampling with single frequency processing (FIG. 6A) is not critical to the performance of the correlator. This is because, in general, a large number of propagation paths (in the time domain and frequency domain) contribute to the received signal, with the path delays with respect to the sampling times being statistically distributed and, furthermore, changing continuously in the short term. It is therefore impossible for a situation to occur in which sampling takes place with the maximum sampling time error all the time. An important factor is that the expected value of the loss which occurs as a result of the sampling time error in FIGS. 6A (single frequency processing, double oversampling) and 6B (double frequency processing, effective sampling at the chip rate). The probability of a sampling time error of magnitude 5 is given by the function p(t) as follows:

$$p(t) = \begin{cases} 1/T_{chip} & : -\frac{T_{chip}}{2} \le t < \frac{T_{chip}}{2} \\ 0 & : \text{else} \end{cases} \quad (1).$$

An RRC function rrc(t) with a roll-off factor of 0.22, as is illustrated in FIGS. 6A and 6B, results in the following expression for the mean loss at the output of the correlator $$D_{Mean}[\text{dB}] = 20 \log \left[ \int_{-0.5T_{chip}}^{0.5T_{chip}} p(t) rrc(t) \, dt \right] \quad (2).$$

For the double oversampled case without frequency shifting (FIG. 6A), this results in a mean loss of $DM_{Mean}^{(2)} \approx -0.4$ dB, while the mean loss for a signal that has not been oversampled is $D_{Mean}^{(1)} \approx -1.4$ dB. As is illustrated in FIGS. 6A and 6B, the poorer time resolution in the situation according to the invention with effective single signal sampling at the chip rate results in a relative loss of −1 dB in comparison to double oversampling of the received signal.

Figure 7A:
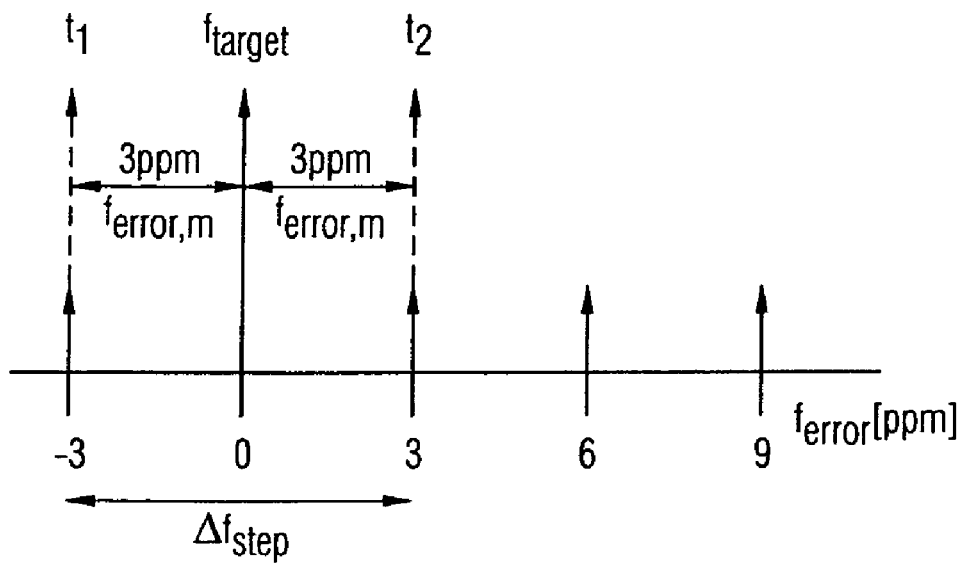
FIG. 7A shows a graph illustrating the maximum frequency error that occurs with conventional single frequency processing for a specific frequency search grid step width.

2. The loss resulting from a frequency error between the oscillator frequency of the transmitter and the oscillator frequency of the mobile radio receiver:

FIG. 7A shows the maximum frequency error $f_{error,m}=3$ ppm with the conventional processing method (double oversampling, single frequency processing). The step width $\Delta f_{step}$ of the frequency search grid is 6 ppm and t1, t2, . . . denote the times of the individual frequency search steps, while $f_{target}$ denotes the sought frequency of the base station.

Figure 7B:
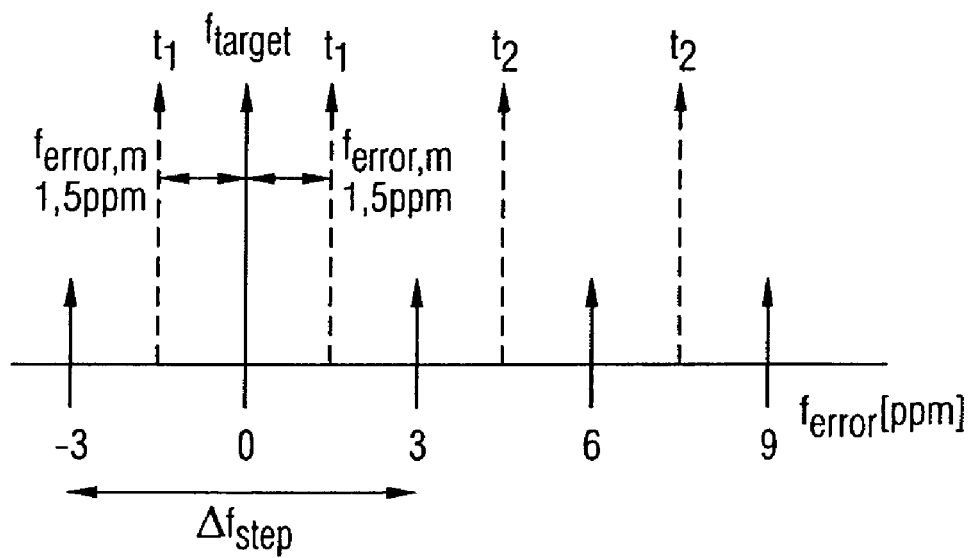
FIG. 7B shows a graph illustrating the maximum frequency error which occurs with the multiple frequency processing according to the invention, for the same frequency search grid step width as that shown in FIG. 7A.

With the same frequency search grid step width of $\Delta f_{step}=6$ ppm, the maximum frequency error with the method according to the invention (sampling at the effective chip rate itself, double frequency processing) is $f_{error,m}=1.5$ ppm. This is because sample values relating to two frequencies are processed in each search step. The respective search grids in FIGS. 7A and 7B are arranged such that the maximum frequency error $f_{error,m}$ in each case occurs for $f_{target}$.

FIG. 8 shows the loss in dB at the output of the correlator as a function of the frequency error $f_{error}$ in ppm with respect to the carrier frequency $f_c$ (2 GHz). The maximum frequency error with the conventional method (double oversampling, single frequency processing) is 3.0 ppm (see FIG. 7A) and is thus virtually −2.5 dB. The maximum frequency error with the method according to the invention (sampling at the effective chip rate itself, double frequency processing) is 1.5 ppm (see FIG. 7B) and is approximately −0.5 dB. In contrast to the analyses relating to the sampling time error (see paragraph 1 above), the loss at the maximum possible error $f_{error,m}$ must, however, be taken into account with regard to the frequency error $f_{error}$. This is because a frequency error has the same effect on all the detectable propagation paths, to be precise irrespective of the base station from which these propagation paths originate or the frequency which they are at. The loss caused by the frequency error is not statistical, but it is deterministic.

Figure 9A:
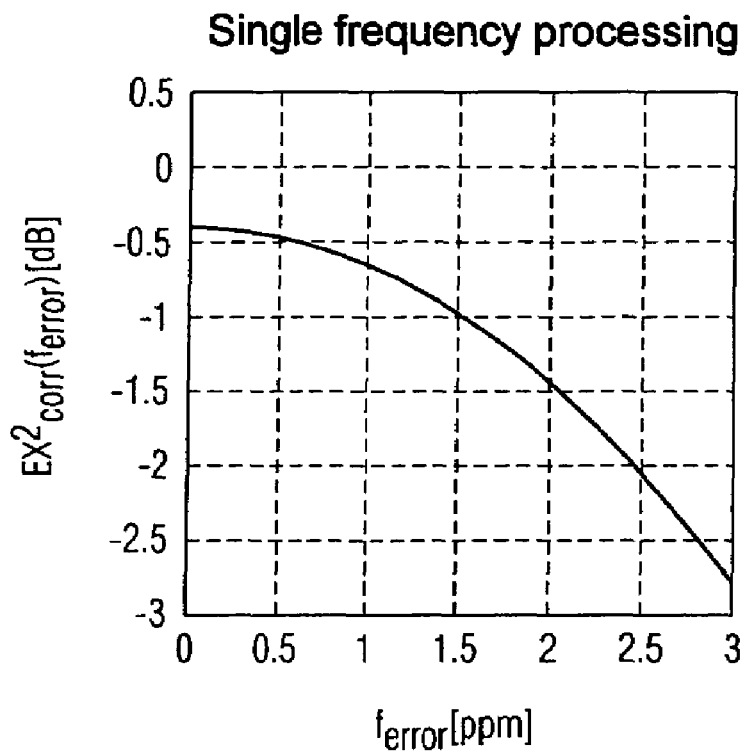
FIG. 9A shows a graph illustrating the expected value $EX^2_{corr}$ of the signal attenuation at the correlator output as a function of the frequency error between the transmitter and receiver for a synchronization apparatus having a single processing frequency (according to the prior art)

FIG. 9A shows the expected value $EX^2_{corr}$ of the signal attenuation of the correlator output signal (that is to say the total loss of the correlator output signal with respect to the signal to be detected, related to the signal power at the correlator output in the case of ideal sampling and ideal frequency matching) as a function of the frequency error $f_{error}$ for the conventional situation with double oversampling and single frequency processing of the sampling phases in the correlator.

The mean signal loss is highly dependent on the frequency error. A loss of virtually −3 dB must be expected with the maximum frequency error of $f_{error,m}$=3 ppm.

Figure 9B:
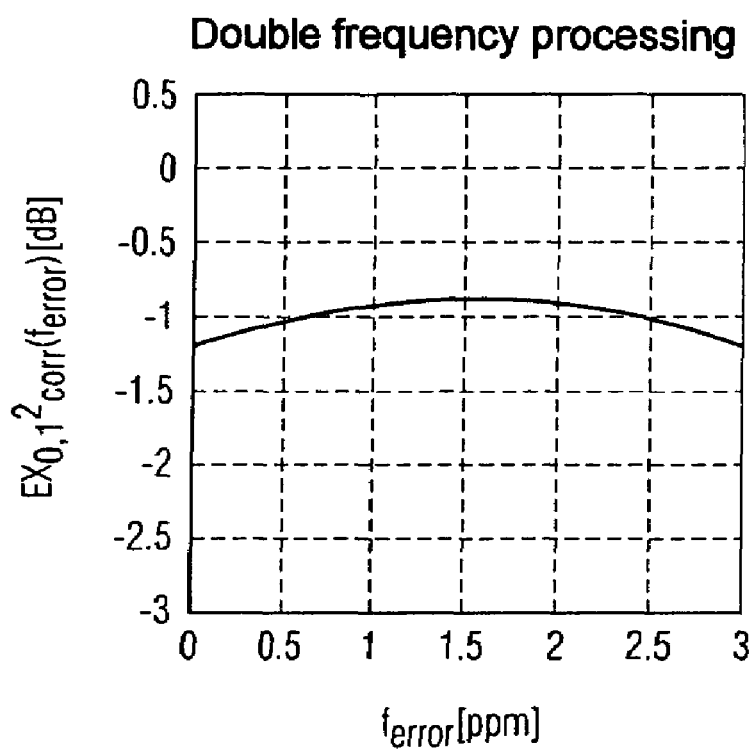
FIG. 9B shows a graph illustrating the expected value $EX_{0,1}^2{}_{corr}$ of the signal attenuation at the correlator output as a function of the frequency error between the transmitter and receiver for a synchronization apparatus having two processing frequencies (according to the invention).

FIG. 9B shows the expected value $EX_{0,1}^{2}{}_{corr}$ of the signal attenuation of the correlator output signal from the correlator for the method according to the invention based on the example explained above, that is to say with double oversampling and with the frequency of the odd-numbered half chips being shifted through 6 kHz (which corresponds to a frequency shift of 3 ppm), thus resulting in effective single sampling in each frequency channel (the indices 0,1 are intended to indicate splitting into the two different sampling phases). The maximum frequency error that occurs is thus 1.5 ppm. As can be seen from the curve, the mean signal degradation for the method according to the invention is virtually independent of the frequency error $f_{error}$.

Although the invention has been illustrated and described with respect to one or more implementations, alterations and/or modifications may be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A method for synchronization of a mobile radio receiver to a base station, comprising:
   sampling, using a sampling component, a received signal comprising a sequence of information units using oversampling, thereby generating an oversampled signal comprising sample values for different sampling phases; and
   correlating the oversampled signal with a local code, wherein a sample value of the oversampled signal associated with a first sampling phase is processed with a first frequency and a sample value relating to the same information unit of the oversampled signal associated with a second different sampling phase is processed with a second different frequency having a frequency offset with respect to the first frequency and is not processed with the first frequency.

2. The method according to claim 1, wherein oversampling comprises sampling the received signal at N times the frequency of the received signal, wherein N comprises an integer greater than or equal to two, and wherein sample values of the resulting N sampling phases are processed with a frequency offset for M different frequencies, wherein M comprises an integer such that M≦N.

3. The method according to claim 2, wherein the M frequencies are distributed substantially equidistantly within a predetermined frequency interval.

4. The method according to claim 3, wherein a length of the frequency interval over which the M frequencies are distributed is approximately 12 kHz.

5. The method according to claim 1, wherein the local code comprises a synchronization code employed for time slot synchronization for the mobile radio system.

6. The method according to claim 1, wherein the local code comprises a synchronization code employed for frame synchronization for the mobile radio system.

7. The method according to claim 1, wherein correlating the oversampled signal with a local code comprises correlating values for different sampling phases of the oversampled signal.

8. An apparatus for synchronization of a mobile radio receiver to a base station, the apparatus receiving sample values representing different sampling phases due to oversampling of a received signal, the apparatus comprising:
   correlating means for correlating the oversampled signal with a local code, the correlating means being configured to process a sample value of the oversampled signal associated with a first sampling phase with a first frequency and to process a sample value relating to the same information unit of the oversampled signal associated with a second different sampling phase not with the first frequency but with a second different frequency having a frequency offset with respect to the first frequency.

9. The apparatus according to claim 8, wherein the correlating means comprises a multiplexer means that receives the oversampled signal comprising an N-times oversampled signal, and the multiplexer means comprising N outputs, wherein the multiplexer means is operable to emit the sample values relating to one of the N sample values representing N different sampling phases at each output, wherein N comprises an integer greater than or equal to two.

10. The apparatus according to claim 9, wherein the correlating means further comprises:
    N correlators arranged in parallel, with each correlator receiving a respective sample value relating to one sampling phase of the N-times oversampled signal; and
    frequency shifting means operable to receive the sample values of the N sampling phases and frequency shift at least M of the N sampling phases with M different frequencies, wherein M is an integer such that M≦N.

11. The apparatus according to claim 10, wherein the M frequencies are distributed substantially equidistantly within a predetermined frequency interval.

12. The apparatus according to claim 8, wherein the local code comprises a synchronization code employed for time slot synchronization for the mobile radio system.

13. The apparatus according to claim 8, wherein the local code comprises a synchronization code employed for frame synchronization in the mobile radio system.

14. The apparatus of claim 8, wherein the means for correlating the oversampled signal with a local code is configured to correlate values for different sampling phases of the oversampled signal with the local code.

15. A method for synchronizing a mobile radio receiver to a base station, comprising:
    transmitting a signal from the base station to the mobile radio receiver, the signal received at the receiver as a received signal;
    oversampling the received signal with an oversampling frequency that is N times greater than a frequency of the received signal, wherein N is an integer greater than or equal to two, thereby generating N streams of sample values, each stream of sample values being associated with one sampling phase;
    frequency shifting at least M of the N streams of sample values with M different frequencies, wherein M is an integer less than or equal to N, thereby forming N streams of sample values after frequency shifting;
    performing N correlations to correlate each of the N streams of sample values after frequency shifting with a local code in the receiver; and synchronizing the mobile radio receiver to the base station based on the correlation.

16. The method of claim 15, wherein the received signal has a frequency associated with a chip period in the UMTS communication standard.

17. The method of claim 16, wherein N is two, and wherein the oversampling frequency is twice the received signal frequency, thereby resulting in two sample values for each received chip, corresponding to an even sampling phase value and an odd sampling phase value per chip.

18. The method of claim 17, wherein frequency shifting is performed on the odd sampling phase sample values, and wherein the frequency shifted sample values are correlated with the local code.

19. The method of claim 18, wherein correlating further comprises:

evaluating a correlation result representing a signal energy per symbol with a threshold value; and communicating a detection of the desired signal for synchronization if the correlation result exceeds the threshold value.

20. The method according to claim 15, wherein the local code comprises a synchronization code employed for time slot synchronization for the mobile radio system.

21. The method according to claim 15, wherein the local code comprises a synchronization code employed for frame synchronization for the mobile radio system.

22. A method for synchronization of a mobile radio receiver to a base station, comprising:

sampling, using a sampling component, a received signal using oversampling, thereby generating an oversampled signal comprising sample values for different sampling phases; and correlating the oversampled signal with a local code, wherein sample values of each sampling phase are processed with a specific frequency associated with the respective sampling phase and are not processed with the specific frequencies associated with the other sampling phases, wherein the specific frequencies associated with the sampling phases are different from each other.

23. An apparatus for synchronization of a mobile radio receiver to a base station, the apparatus comprising:

a sampling unit for oversampling a received signal to produce an oversampled signal comprising sample values for different sampling phases; and a correlator for correlating the oversampled signal with a local code, wherein the correlator is configured to process sample values of each sampling phase with a specific frequency associated with the respective sampling phase and not with the specific frequencies associated with the other sampling phases, wherein the specific frequencies associated with the sampling phases are different from each other.

* * * * *